United States Patent
Nakata et al.

(10) Patent No.: US 8,162,658 B2
(45) Date of Patent: Apr. 24, 2012

(54) INJECTION MOLDING DIE

(75) Inventors: Osamu Nakata, Tsu (JP); Mitsuhiro Takayama, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 12/598,896

(22) PCT Filed: Apr. 23, 2008

(86) PCT No.: PCT/JP2008/057833
§ 371 (c)(1),
(2), (4) Date: Nov. 4, 2009

(87) PCT Pub. No.: WO2008/139868
PCT Pub. Date: Nov. 20, 2008

(65) Prior Publication Data
US 2010/0086637 A1    Apr. 8, 2010

(30) Foreign Application Priority Data

| May 7, 2007 | (JP) | 2007-122325 |
| May 7, 2007 | (JP) | 2007-122362 |
| May 7, 2007 | (JP) | 2007-122363 |
| May 7, 2007 | (JP) | 2007-122364 |

(51) Int. Cl.
    B29C 45/32    (2006.01)
(52) U.S. Cl. ............ 425/572; 264/271.1; 264/275; 264/328.12
(58) Field of Classification Search .......... 425/572; 264/328.12, 271.1, 274, 275
See application file for complete search history.

(56) References Cited

U.S. PATENT DOCUMENTS 4,252,294 A * 2/1981 Uchio ............. 425/572
7,094,375 B2 * 8/2006 Nakata ............. 264/274

FOREIGN PATENT DOCUMENTS

| EP | 0 493 809 A1 | 7/1992 |
| JP | 57-185130 A | 11/1982 |
| JP | 59-107223 U | 7/1984 |
| JP | 62-256621 A | 11/1987 |
| JP | 4-14856 B2 | 3/1992 |
| JP | 4-286610 A | 10/1992 |
| JP | 5-57797 A | 3/1993 |
| JP | 5-104642 A | 4/1993 |
| JP | 5-285990 A | 11/1993 |
| JP | 7-144338 A | 6/1995 |

(Continued)

OTHER PUBLICATIONS

International Search Report with English translation dated Jul. 29, 2008 (Five (5) pages).
PCT/ISA/237 dated Jul. 29, 2008 (Five (5) pages).
Japanese Office Action (2007-122362) dated Sep. 30, 2011 (two (2) pages).

(Continued)

*Primary Examiner* — Timothy Heitbrink
(74) *Attorney, Agent, or Firm* — Crowell & Moring LLP

(57) ABSTRACT

There is provided an injection die characterized in that the injection die is separated into at least two pieces, that a cavity for frame is formed between the separated dies, that the cavity for frame is provided with an additional cavity via a coupling hole, and that the coupling hole communicating with the additional cavity is provided at a confluence point of a resin in melted condition of the cavity for frame, at around a gate, at around a cavity for a fixing component, or at around a cavity for frame of which thickness is deep.

12 Claims, 8 Drawing Sheets

FOREIGN PATENT DOCUMENTS

| | | |
|---|---|---|
| JP | 7-227888 A | 8/1995 |
| JP | 11-170303 A | 6/1999 |
| JP | 2002-96633 A | 4/2002 |
| JP | 2005-47257 A | 2/2005 |

OTHER PUBLICATIONS

Japanese Office Action (2007-122364) dated Sep. 30, 2011 (two (2) pages).

* cited by examiner

INJECTION MOLDING DIE

TECHNICAL FIELD

The present invention relates to a glass with a frame, in which the frame is molded to be integral with a plate glass, and particularly to an injection die used for integrally molding the frame onto the plate glass.

BACKGROUND OF THE INVENTION

In windows of vehicles such as trains and cars, it is general that a plate glass is mounted on a metal vehicle body using a resin frame.

In recent years, a resin frame is molded directly onto a plate glass by an extrusion molding or injection molding of a resin in a condition having fluidity, and a glass with a frame, in which the frame and the plate glass are in one-piece, is used as a component for assembling vehicles.

In the case of producing a glass with a frame by injection molding, as shown in FIG. 19, plate glass 93 is retained between upper die 91 and lower die 92, and cavity 94 for frame is formed at a peripheral portion of plate glass 93. A resin in melted condition is injected into this cavity 94 for frame. After solidification of the resin in melted condition injected into cavity 94 for frame, upper die 91 is taken away, a glass with frame, in which the frame has been molded to be integral with the plate glass, is taken out of lower die 92, thereby producing the glass with frame.

In the case of molding a frame by injection molding to be integral with a plate glass, there is a problem in which the plate glass breaks by pressure of a melted resin flowing in the cavity of the die. To solve this breakage problem, it is disclosed in Patent Publication 1 that a frame is prepared by injection molding using a dummy plate, and the prepared frame is taken out of the dummy plate and then is bonded to a plate glass.

A method like that of Patent Publication 1, in which a frame is molded by using a dummy plate, then the frame is taken out of the dummy plate, and the frame taken out is mounted on a plate glass, is problematic in productivity.

Other than such preparation of a glass with frame, in the case of a resin molding by injecting a resin in melted condition into a die, a resin in melted condition injected into a cavity for frame flows by split flows. When the resins that have flowed by split flows join together, it is known that a defect portion of the surface that is called a weld line and becomes problematic in external appearance is formed at confluence position.

In order to prevent the occurrence of a defect of weld line, a technique is disclosed in Patent Publication 2 that a resin receiver is provided to disturb orientation of the resin or filler at weld line.

It is disclosed in Patent Publication 3 that, after a cavity is filled with a resin, the resin is moved into a resin receiver that is openable and closable and is provided in the vicinity of the confluence position, thereby moving the resin around the weld line.

Furthermore, in the case of molding a frame to be integral with a plate glass by injection molding, there occurs a defect, such as unevenness or sink, by contraction at a relatively thick portion of the frame, when the resin in melted condition solidifies by cooling.

It is disclosed in Patent Publication 4 that a pressurized gas is introduced into an injected resin. According to the method of injecting a pressurized gas, it is quite difficult to eliminate unevenness or sink on the frame surface, depending on the form of the section of the frame.

Patent Publication 1: Japanese Patent Application Publication 5-057797
Patent Publication 2: Japanese Patent Application Publication 5-285990
Patent Publication 3: Japanese Patent Application Publication 7-227888
Patent Publication 4: Japanese Patent Application Publication 11-170303

SUMMARY OF THE INVENTION

It is a task of the present invention, in the case of molding a frame to be integral with a plate glass by injection molding, to provide a die for injection molding, which is capable of eliminating breakage of the plate glass due to pressure of a melted resin flowing in a cavity of the die.

Furthermore, when a fixing component, such as clip or fastener, is inserted into a cavity for fixing component, and then a resin is injected into the cavity for fixing component, thereby making the fixing component integral with the plate glass, there is a problem in which the plate glass or fixing component breaks by pressure of the resin in the cavity for fixing component. It is a task to provide an injection die that prevents the plate glass or fixing component from breaking by pressure of a resin that is injected into such cavity for fixing component.

Still furthermore, it is a task to provide an injection die that does not generate a defect, such as unevenness or sink, of the frame surface.

In an injection die used for molding a resin frame by injection molding at a peripheral portion of a plate glass, an injection die of the present invention is separated into at least two pieces, a cavity for frame is formed between the separated dies, and the cavity for frame is provided with an additional cavity via a coupling hole. This injection die contains at least one characteristic of the following first to fourth characteristics:

(1) first characteristic that the coupling hole is provided at a confluence point of a resin in melted condition of the cavity for frame;

(2) second characteristic that the cavity for frame is provided with a runner that couples via a gate and is for injecting a resin injected from a resin inlet, into the cavity for frame, and the coupling hole and the gate are provided such that center line of the coupling hole and center line of the gate intersect with each other at an angle ranging from 45 degrees to 180 degrees on a section parallel to the plate glass of the cavity for frame;

(3) third characteristic that the cavity for frame is provided in communicating manner with a cavity for fixing component, for making the fixing component integral, via a first coupling hole, and the cavity for frame or cavity for fixing component is provided with a second coupling hole to be opposite to the first coupling hole, and the additional cavity is provided to have a communication by the second coupling hole; and (4) fourth characteristic that the cavity for frame, for forming a frame to have a thickness of from 4 mm to 12 mm, is provided, via a coupling hole, with an additional cavity that forms a closed space having no communicating space except the coupling hole.

The injection die of the present invention may be an injection die characterized in that, in the above injection die, the additional cavity is formed between the dies that are separated.

The injection die of the present invention may be an injection die characterized in that, in the above injection die, the additional cavity is formed in only one die of the dies that are separated.

The injection die of the present invention is an injection die characterized in that, in the above injection die, when the frame is formed, the additional cavity forms a closed space, except in that it couples with the cavity for frame via the coupling hole.

The injection die of the present invention may be an injection die characterized in that, in the above injection die, the additional cavity is formed by closing the runner and couples with the cavity for frame via the gate.

DETAILED DESCRIPTION

An injection die used for producing a glass with frame of the present invention makes it possible to provide an injection die that makes little breakage of plate glasses during molding of frame bodies.

The present invention is explained based on drawings with respect to the case of a separation into upper die and lower die. The present invention is not limited to the case of a separation into upper die and lower die, but can be applied to a die that is separated into left and right.

As a resin for forming the frame, it is possible to use a thermoplastic elastomer such as styrene series, olefin series, vinyl chloride series, and urethane series.

In the case of molding a resin frame to be integral with a peripheral portion of a plate glass, there occurs a problem that the plate glass breaks during the injection molding.

In the following, the first characteristic of the present invention is exemplarily described in detail.

By observation of broken plate glasses, there were observed many occurrences of the plate glass breakage at a position (confluence point) at which resins flowing in the cavity for frame are confluent.

Patent Publications 2 and 3 disclose techniques for avoiding the problem of confluence point with respect to the resin body that is subjected to injection molding, but both only move weld line. It is difficult to avoid the pressure increase at confluence point of the resin in flow.

The cavity for frame is provided with a gas purging hole and the like, and it is designed that no excessive load is put on plate glass. It is, however, considered that the quantitative or pressure variation of the resin to be injected and variation of glass shape make the pressure increase of resin at confluence point beyond expectation, thereby breaking plate glasses.

Figure 1:
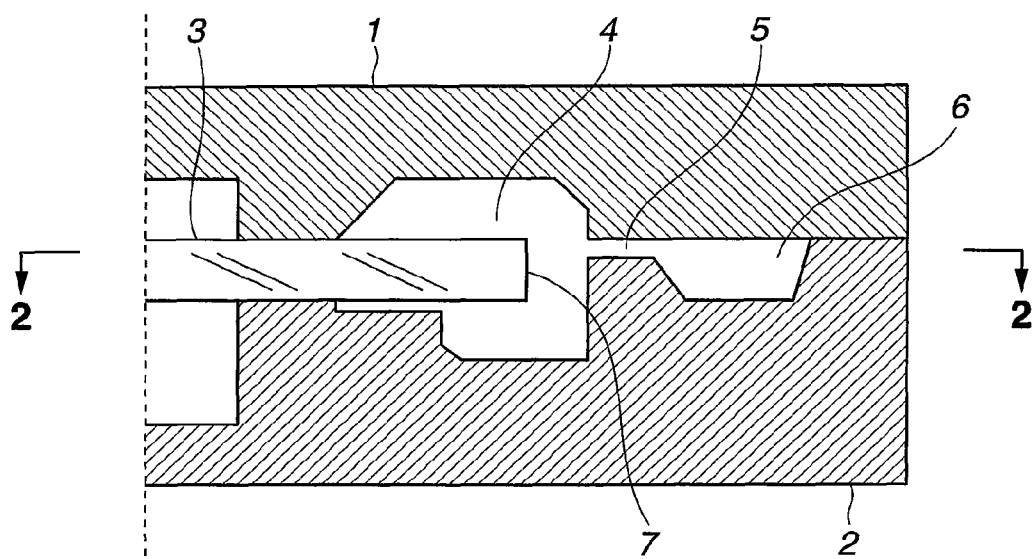
FIG. 1 is a schematic section of around the cavity for frame of Example 1.

FIG. 1 is a schematic section for producing a window glass with frame that is produced by injection molding. Plate glass 3 is retained between upper die 1 and lower die 2, and cavity 4 for frame is formed at an edge portion of plate glass 3. A resin that is melted and has fluidity is injected into this cavity 4 for frame from an inlet not shown in the drawings, thereby integrally forming a frame onto the peripheral portion of plate glass 3.

In the case of molding a frame by injection die to be integral with plate glass, a resin in melted condition is injected from an inlet of the die into a cavity for frame via at least two runners. The runner couples with cavity 4 for frame at a gate having a bore narrower than that of the runner.

The resin injected from runner is separated at the cavity for frame, and the separated resins flow in the cavity for frame and are confluent in cavity 4 for frame. Since the pressure of the melted resin increases at the confluent position (confluence point), a bending load tends to occur at an edge of plate glass.

Breaking load of an edge of plate glass is quite small as compared with the center portion. When bending load is generated at an edge portion of plate glass by flow of melted resin at confluence point, that is, at a position where resins flowing from different directions in the cavity for frame collide with each other, it is highly possible that the plate glass breaks.

Therefore, as shown in FIG. 1, it is preferable that coupling hole 5 is provided at a position where melted resins injected into the cavity 4 for frame are confluent, and additional cavity 6 communicating with coupling hole 5 is provided, thereby preventing pressure of the resin from increasing at a position where resins in cavity 4 for frame are confluent.

Figure 2:
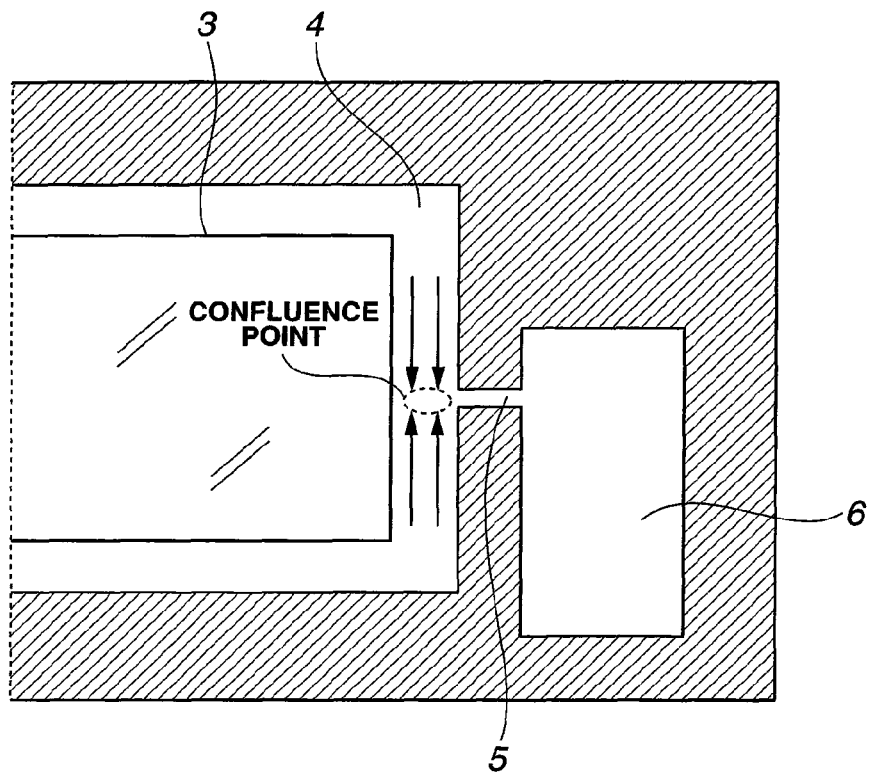
FIG. 2 is a horizontal section along lines 2-2 of FIG. 1.

FIG. 2 is a section along lines 2-2 of FIG. 1. Additional cavity 6 couples with cavity 4 for frame via coupling hole 5. As shown in FIG. 2, it is preferable to provide coupling hole 5 at a position where the resins of the cavity for frame are confluent.

Upon forming the frame, the resin is prevented from being forced out of the die by that additional cavity 6 forms a closed space except that it couples with cavity 4 for frame via the coupling hole 5. Therefore, it is preferable.

It is necessary to sufficiently fill cavity 4 for frame with the resin in melted condition. Therefore, it is necessary to have a gas purging hole for purging a gas generated from the resin in melted condition and an air existing prior to injecting the resin in melted condition, out of the cavity for frame. It is, however, preferable that the additional cavity is free from a gas-purging hole for purging gas that couples with the outside of the die.

In the vicinity of coupling hole 5, it becomes unnecessary to have a gas-purging hole for purging a gas generated from the resin in melted condition and an air existing prior to injecting the resin in melted condition.

As shown in FIG. 1, it is preferable to form additional cavity 6 in lower die 2, since it becomes easy to remove upper die 1. However, it may be formed in a manner to extend over lower die 2 and upper die 1, or it may be formed only in upper die 1.

It is preferable to form coupling hole 5 in a manner that its longitudinal direction, that is, the direction in which the melted resin flow becomes perpendicular to edge face 7 of the plate glass, since it lowers a load for bending plate glass, which is generated by the resin flowing.

Figure 3:
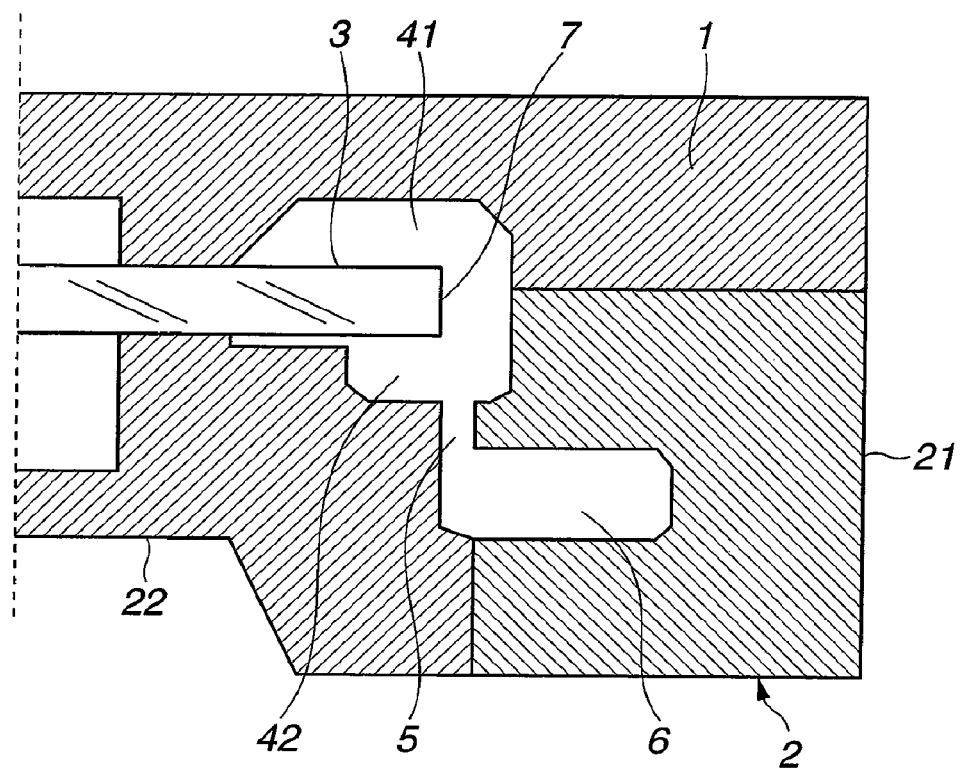
FIG. 3 is schematic section of around the cavity for frame showing an example different from Example 1.

FIG. 3 shows a case in which coupling hole 5 has been provided in a manner to be parallel with edge face 7 of plate glass. This is effective for lowering load occurring on plate glass when they are confluent, as a result of that there occurs a difference in confluence time of resins in melted condition between upper cavity 41 for frame and lower cavity 42 for frame of the edge face of plate glass or that there is a difference in cross section between upper cavity 41 for frame and lower cavity 42 for frame of the edge face of plate glass.

In case that an additional cavity shown in FIG. 3 is formed in lower die 2, lower die 2 is separated into lower die 21 and lower die 22, and additional cavity 6 is provided between lower die 21 and lower die 22. In general, the upper die 1 is used as a mobile-type, and lower die 2 is used as an immobile-type. It is preferable to use lower die 22 as a mobile-type, since it is easy to take a glass with a frame, in which the frame has integrally been molded, out of lower die 2.

In an injection die for integrally molding a frame onto a plate glass, a resin injected from an inlet is injected into the cavity for frame via runner. In many times, at least two runners are provided, and the runner couples with cavity 4 for frame by a gate having a diameter that is narrower than that of the runner.

In such injection die in which resin in melted condition is injected into the cavity for frame via at least two runners, if one runner is closed, the vicinity of the gate of the runner becomes a confluence point of the resin in many times.

Therefore, it is possible to close a place in the vicinity of the inlet of the runner, thereby providing an additional cavity of the present invention. Furthermore, in the case of using the runner as the additional cavity, the gate acts as a coupling hole. Therefore, it is possible to preferably use a runner provided in the injection die, as an additional cavity.

As shown in FIG. 1, in the case of providing coupling hole 5 at a position where the resins in melted condition injected into cavity 4 for frame are confluent in cavity 4 for frame and furthermore in the case of providing additional cavity 6 that couples with coupling hole 5, it is desirable that the amount of the resin injected is greater than the volume of the cavity for frame and is less than the total of the volume of cavity 4 for frame and the volume of additional cavity 6.

In the following, the second characteristic of the present invention is exemplarily described in detail.

Figure 5:
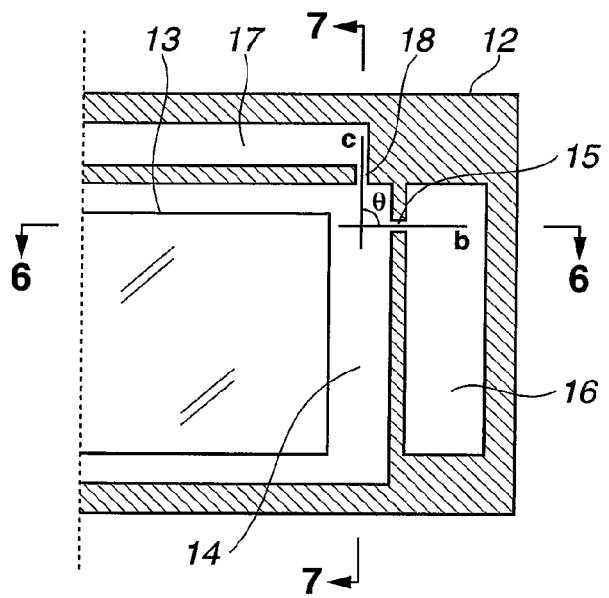
FIG. 5 is a schematic horizontal section of around the gate of the cavity for frame.

As shown in FIG. 5, a frame is formed by injecting a resin in melted condition into cavity 14 for frame from an inlet, not shown in the drawings, of the die via runner 17.

Cavity 14 for frame and runner 17 have a communication with each other via gate 18.

By observation of broken glasses, there were observed many plate glasses broken in the vicinity of the gate at which the resin is injected into cavity 14 for frame from runner 17.

In many times, the position at which gate 18 of the die is provided is determined by the shape of the frame. Depending on the position at which gate 18 is provided, there may occur a case in which frequency of breakage of plate glasses is high and in which injection molding of the frame becomes difficult.

It becomes possible by the present invention to provide a die that produces less breakage of plate glasses due to the position of the gate even if the gate is provided at any position.

Figure 6:
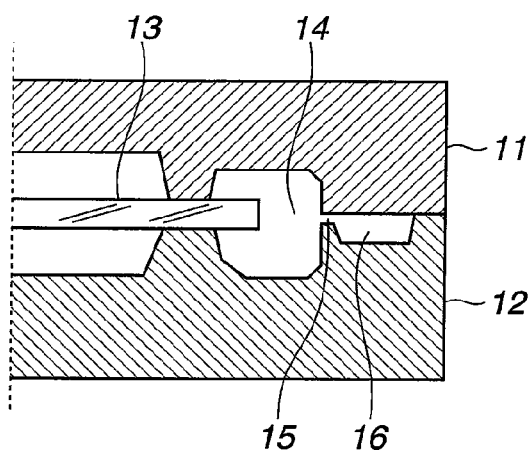
FIG. 6 is a vertical section along lines 6-6 of FIG. 5.

As in FIGS. 5 and 6, plate glass 13 is retained between upper die 11 and lower die 12, and cavity 14 for frame is formed at an edge portion of plate glass 13. Melted resin having fluidity is injected into this cavity 14 for frame from runner 17, thereby integrally forming a frame at a peripheral portion of plate glass 13.

Runner 17 for injecting resin into cavity 14 for frame is provided at one place or more. Resin in melted condition is injected into cavity 14 for frame from runner 17 via gate 18.

In the vicinity of cavity 14 for frame, with which runner 17 couples, when the injection is started, a large pressure of the melted resin is added as load to the edge of plate glass 13. Thus, there is a high possibility that plate glass 13 breaks.

Therefore, as shown in FIG. 5, it is desirable to reduce pressure of the resin in melted condition, when the resin is injected into cavity 14 for frame, by providing cavity 14 for frame, into which the resin in melted condition is injected, with additional cavity 16 via coupling hole 15 on a horizontal section containing gate 18.

Figure 7:
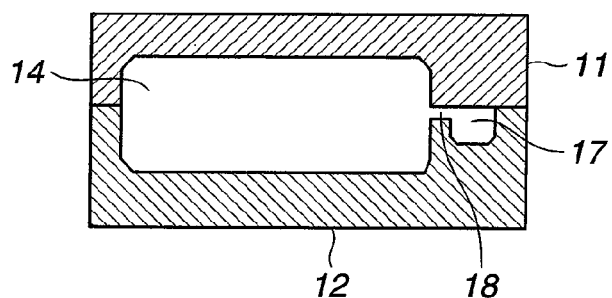
FIG. 7 is a vertical section along lines 7-7 of FIG. 5.

FIG. 6 is a vertical section along lines 6-6 of FIG. 5, and additional cavity 16 formed in lower die 12 couples with cavity 14 for frame via coupling hole 15. Furthermore, as shown in FIG. 7 (a section along lines 7-7 of FIG. 5), the resin flowing via runner 17 is injected into cavity 14 for frame from gate 18.

Although additional cavity 16 is formed in lower die 12, it is optional to form additional cavity 16 only in upper die 11 or in both of upper die 11 and lower die 12.

In order that additional cavity 16 can effectively reduce pressure of the resin, as shown in FIG. 5, it is desirable to set angle θ, at which center line c of gate 18, from which the resin in melted condition is injected, and center line b of coupling hole 15 intersect with each other, in a range of 45 degrees to 180 degrees.

When diameter of gate 18 and diameter of coupling hole 15 are different from each other, or when runner 17 is formed in lower die 12 and additional cavity 16 is formed in upper die 11, the positions of the center lines in elevation direction become different from each other so that they do not intersect with each other. Therefore, herein, intersectional angle θ is defined as an angle at which they intersect with each other on the horizontal plane as a result of projecting center line c of gate 18 and center line b of coupling hole 15 onto the horizontal section (a section parallel with the plane of plate glass) of cavity for frame in vertical direction (a direction perpendicular to the plane of plate glass).

In case that the injection die is separated into left and right, the direction parallel to the plane of plate glass becomes a horizontal direction, and the section of the cavity for frame, which is parallel to the plane of plate glass, becomes vertical section. Therefore, center line c of gate 18 and center line b of coupling hole 15 are both projected in horizontal direction and are projected onto the vertical section of cavity for frame.

Figure 8:
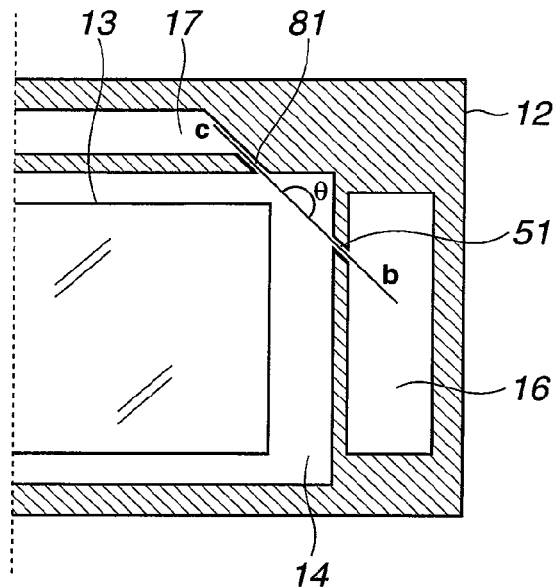
FIG. 8 is a horizontal section showing an example of a lower die in which the angle θ between center line of the gate and center line of the coupling hole is 180°.
Figure 9:
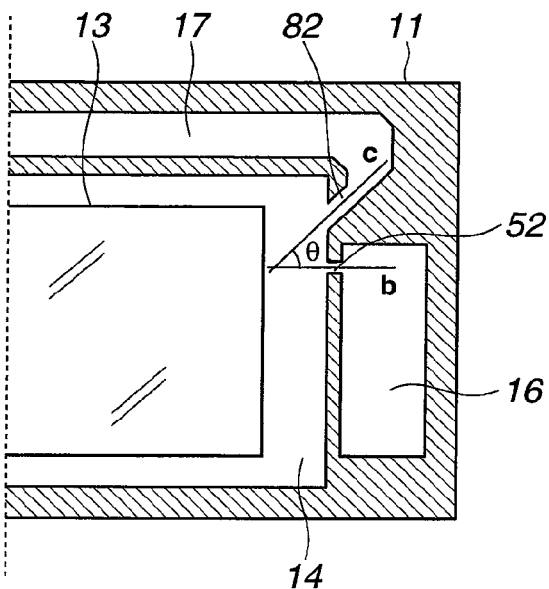
FIG. 9 is a horizontal section showing an example of a lower die in which the angle θ between center line of the gate and center line of the coupling hole is 45°.

FIG. 8 shows an example of the die in which center line c of gate 81 and center line b of coupling hole 51 make 180 degrees. FIG. 9 shows an example of the die in which center line c of gate 82 and center line of coupling hole 52 make 45 degrees.

It is preferable to produce the die such that additional cavity 16 is formed in only upper die 11, only lower die 12, or in a manner to extend over upper die 11 and lower die 12.

It is desirable that center line c of gate and center line b of coupling hole intersect with each other if possible. In case that they do not intersect with each other, it is desirable to adjust intersectional angle θ by an angle on the section parallel to the plane of plate glass of cavity for frame, onto which center line c of gate and center line b of coupling hole have been projected.

It is preferable that, when the frame is formed, additional cavity forms a closed space except in that it couples with cavity 14 for frame via the coupling hole, since resin does not come out of the die.

As shown in FIGS. 5, 8 and 9, in the case of providing additional cavity 16 in the vicinity of gate 18, 81, 82 via coupling hole 15, 51, 52, it is desirable that the amount of the resin to be injected is made to be greater than the volume of the cavity for frame and to be less than the total of the volume of cavity 14 for frame and the volume of additional cavity 16.

In the following, the third characteristic of the present invention is exemplarily described in detail.

In general, a glass with frame is fixed to a vehicle body by adhesive. A fixing component, such as clip or fastener, is used for a temporary hold until the adhesive solidifies to firmly fix the glass with frame to the vehicle body.

In the preparation of a glass with frame by injection molding, the fixing component is made to be integral with the plate glass in many times simultaneously with molding of the frame by forming a cavity for the fixing component in the die.

The fixing component is inserted into the cavity for fixing component of the die, and the resin is injected into the cavity for frame to mold the frame. At the same time, the resin is allowed to flow also into the cavity for fixing component that couples with the cavity for frame, thereby simultaneously conducting an integration of the fixing component.

Upon this, the plate glass or fixing component may break by pressure of the resin flowing into the cavity for fixing component.

Figure 11:
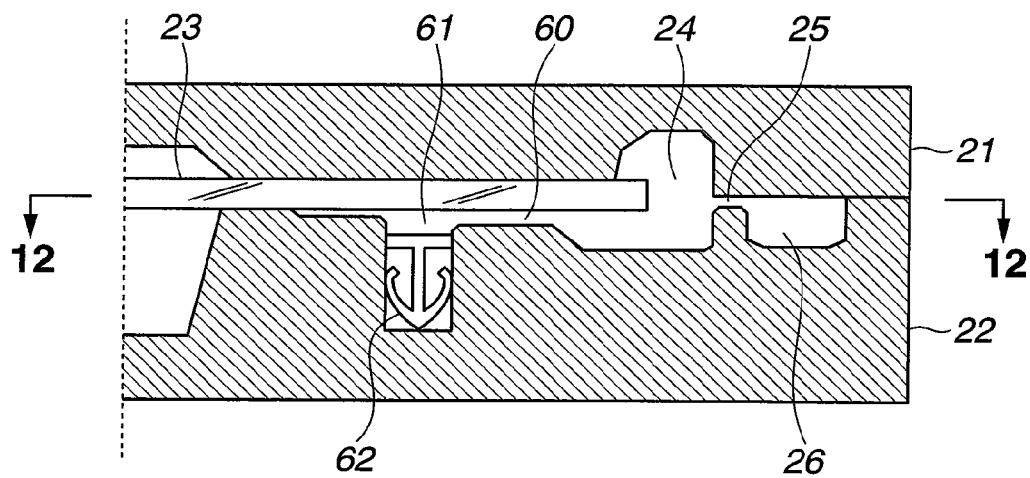
FIG. 11 is a schematic section of around a cavity for fixing component in the case of providing the cavity for frame with a coupling hole of the additional cavity.

Regarding integration of the fixing component, for example, as in FIG. 11, lower die 2 is provided at cavity 24 for frame with cavity 61 for fixing component via the first coupling hole 60. Upon molding the frame, the fixing component (clip 62) is inserted into cavity 61 for fixing component, and an integration between the fixing component (clip 62) and plate glass 23 is conducted by a resin flowing into cavity 61 for fixing component.

In order to prevent breakage of the above-mentioned plate glass and fixing component, for example, as in FIG. 11, cavity 24 for frame is provided with coupling hole 25 in a manner to be opposed to the first coupling hole 60, and additional cavity 26 is provided to communicate with coupling hole 25.

Figure 12:
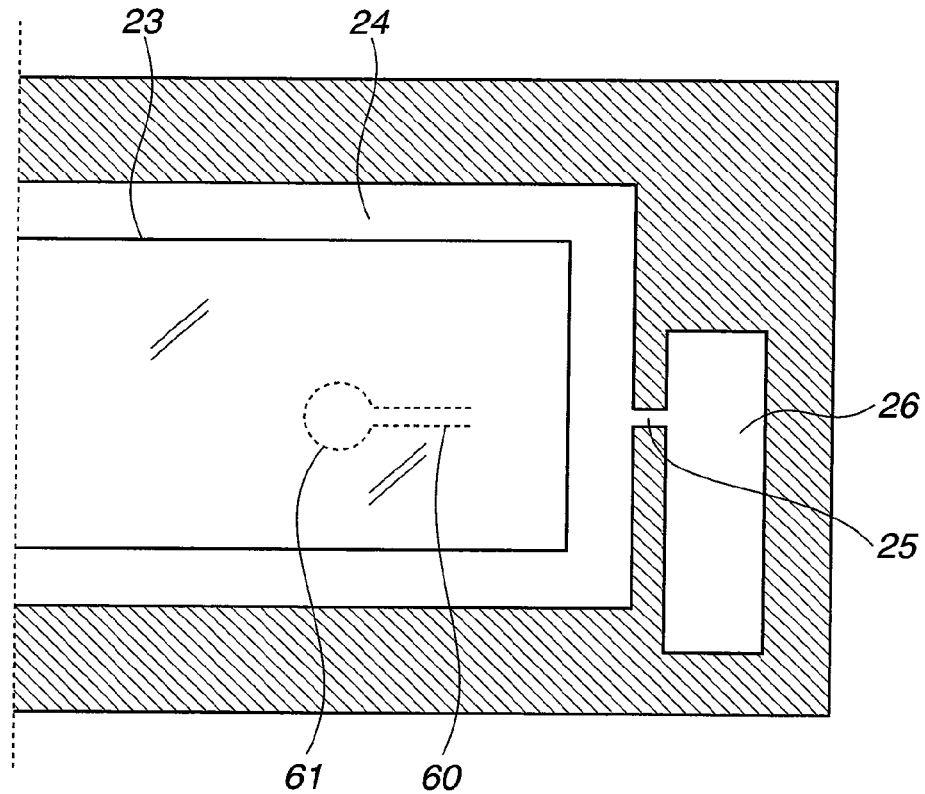
FIG. 12 is a horizontal section along lines 12-12 of FIG. 11.

A horizontal section along lines 12-12 of FIG. 11 is shown in FIG. 12. It shows a horizontal sectional shape of coupling hole 25 and additional cavity 26. It is desirable to dispose coupling hole 25, relative to the first coupling hole 60 shown in a broken line, on the extension of center line of the first coupling hole 60.

Figure 13:
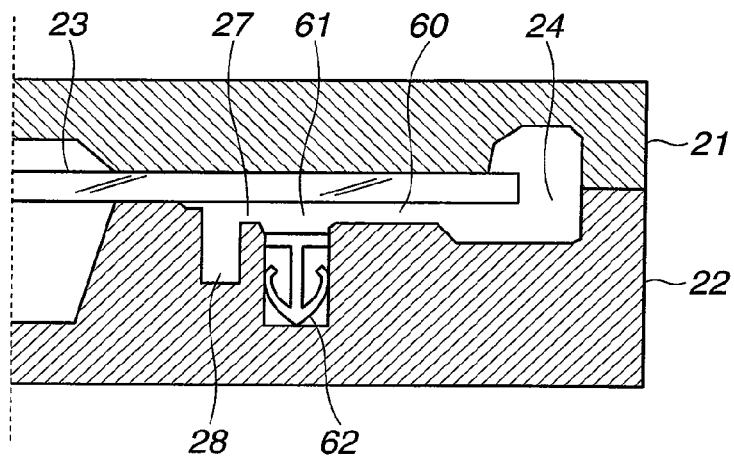
FIG. 13 is a schematic section of around a cavity for fixing component in the case of providing the cavity for fixing component with a coupling hole of the additional cavity.

FIG. 13 shows an example of the case in which coupling hole 27 is provided to have a communication with cavity 61 for fixing component. Additional cavity 28 is provided to have a communication with coupling hole 27.

Figure 14:
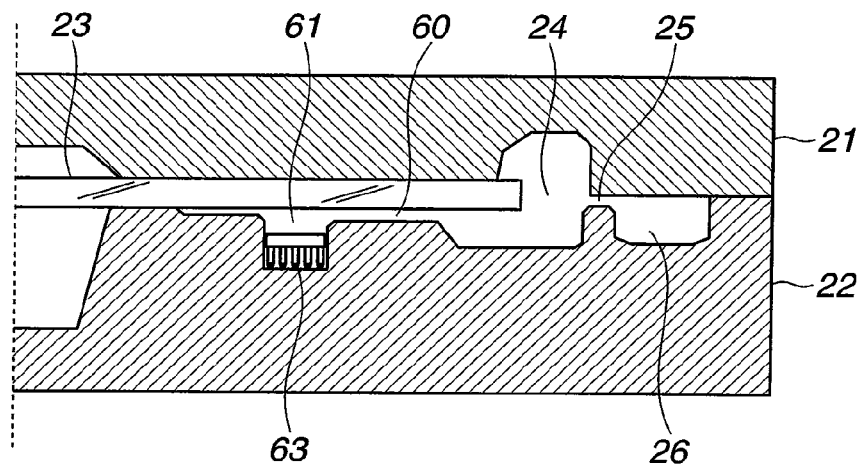
FIG. 14 is a schematic section of around the cavity for frame in the case of making the fastener integral.

FIG. 14 shows an example of the case of using fastener 63 as the fixing component.

Additional cavity 26 may be formed in either upper die 21 or lower die 22, or may be formed in a manner to extend over upper die 21 and lower die 22.

As shown in FIGS. 11, 13 and 14, in the case of conducting an injection molding of the frame with an integration of fixing component 62 or 63, it is desirable that the amount of the resin to be injected for molding is greater than 105% of the total volume of cavity 24 for frame, cavity 61 for fixing component and first coupling hole 60 and is less than a volume obtained by adding the volume of additional cavity 26 or 28 to the total volume of cavity 24 for frame, cavity 61 for fixing component and first coupling hole 60.

In the following, the fourth characteristic of the present invention is exemplarily described in detail.

Figure 18:
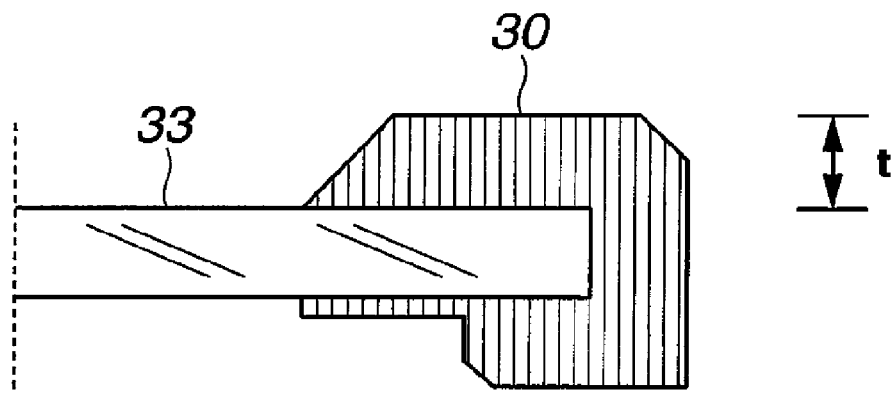
FIG. 18 is a section of around an edge of a glass with frame prepared by Example 4.
Figure 19:
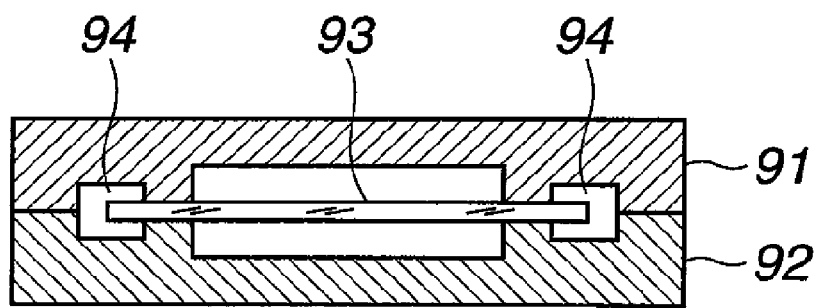
FIG. 19 is a schematic section showing the positions of the dies and the plate glass of the injection molding for preparing a glass with frame.

If thickness t of frame 30 formed at a periphery of plate glass 33, which is shown in FIG. 18, is deep, there occurs a problem in which the resin contracts as temperature lowers until it solidifies after it has been injected into the cavity for frame, thereby generating unevenness and sink on the surface of the frame. Therefore, as shown in FIG. 16, it is preferable to provide additional cavity 36 at a place where defects of unevenness and sink generate occur.

Figure 16:
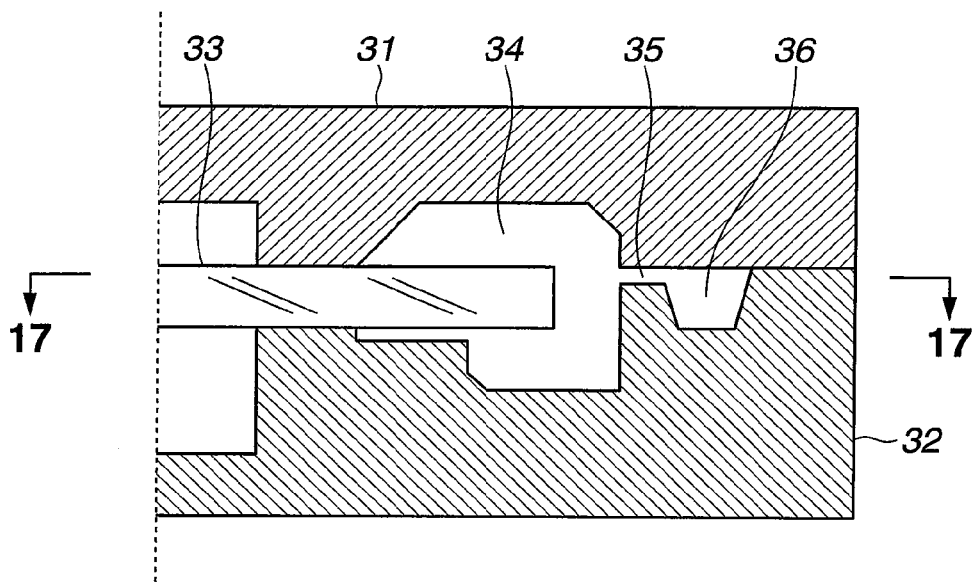
FIG. 16 is a schematic section showing the positions of the dies and the plate glass of the injection molding for preparing a glass with frame.
Figure 17:
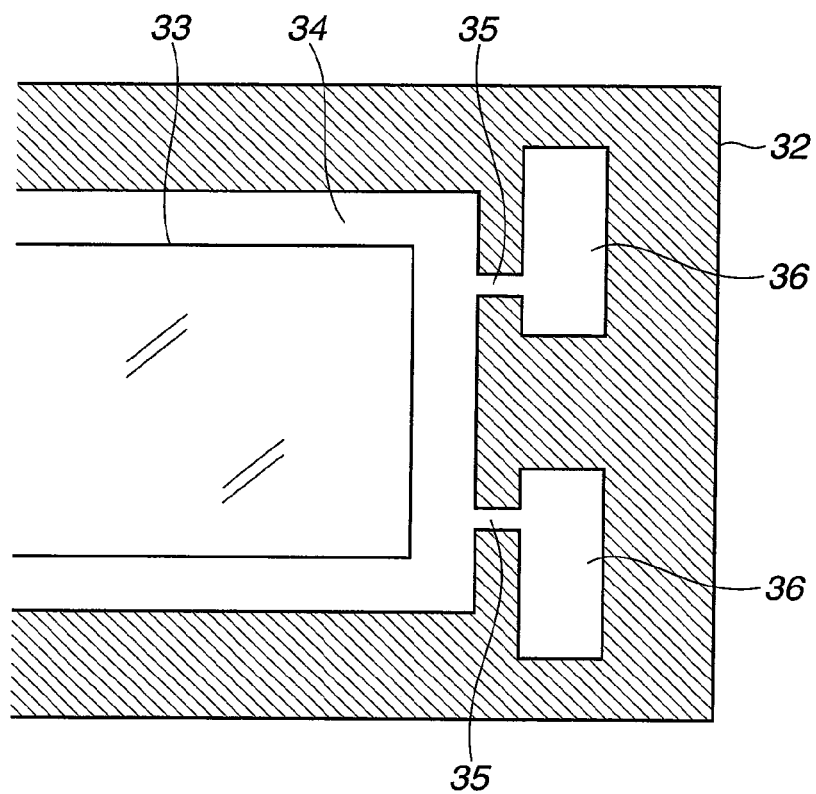
FIG. 17 is a horizontal section along lines 17-17 of FIG. 16.

In FIG. 16, cavity 34 for frame is provided with additional cavity 36 via coupling hole 35 in lower die 32.

It is preferable that additional cavity 36 has no communication with outside except coupling hole 35. Due to that additional cavity 36 becomes a closed space, the air of additional cavity 36 becomes a compressed condition, and thereby turning the resin in the cavity for frame in a pressurized condition until the resin solidifies after it has been injected into the cavity for frame, into a pressurized condition. Therefore, there do not occur sink or unevenness of the surface and the like.

In particular, sink tends to occur at a place where thickness t of frame 30, which is shown in FIG. 18, becomes 4 mm or greater. Since one that is about 12 mm in thickness of frame 30 has been designed, it is preferable to provide cavity 34 for frame for molding frame 30 in which thickness t is 4 mm or greater and 12 mm or less, with the coupling hole.

In the case of integrally molding the frame onto plate glass by the injection die, a resin in melted condition that is injected from an inlet of the die is injected into the cavity for frame via at least two runners. The runner couples with the cavity for frame via a gate having an inner diameter that is smaller than that of the runner.

In such die, it is possible to mold a frame that is free from sink by closing at least one runner at a place near the inlet and by using it as additional cavity. In this case, the gate becomes a coupling hole.

As shown in FIG. 16, in case that coupling hole 35 and additional cavity 36 that couples with coupling hole 35 are provided at a place where thickness t of frame is deep, it is desirable that the amount of the resin to be injected is made to be greater than the volume of cavity for frame and to be less than the total of the volume of cavity 34 for frame and the volume of additional cavity 36.

EXAMPLES

In the following, the present invention is specifically explained by examples. However, the present invention is not limited by the examples. The following Examples 1-4 correspond to the first to fourth characteristics of the present invention, respectively. Comparative Example 1 is in contrast with Example 1.

Example 1

Figure 4:
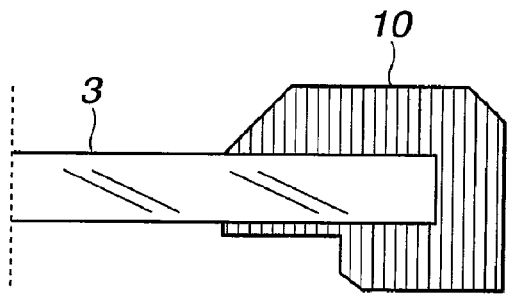
FIG. 4 is a section of around an edge of a glass with frame prepared in Example 1.

FIG. 4 shows a section of a frame portion of a glass with frame, which has been produced by a die according to the present invention, and in which frame 10 has been integrated with plate glass 3.

This glass with frame was produced by using a die shown in FIG. 1. The die was composed of upper die 1 and lower die 2. Lower die 2 was provided with additional cavity 6 communicating with cavity 4 for frame via coupling hole 5.

Confluence position was estimated from the position of inlet of the resin, not shown in drawings, and the volume of cavity 4 for frame, and the position of coupling hole 5 was set at the confluence position.

As shown in FIG. 1, plate glass 3 was retained between upper die 1 and lower die 2 in a manner that a peripheral portion of plate glass 3 was positioned in cavity 4 for frame, and a polyvinyl chloride series resin was injected from an inlet, not shown in the drawings, of the die.

Then, after the resin solidified, upper die 1 was removed, and plate glass 3 with the molded frame was taken out of lower die 2. A glass with frame shown in FIG. 4 was produced by cutting off the resin formed in coupling hole 5 and additional cavity 6.

In the production of this glass with frame, there was almost no occurrence of breakage of plate glass at around confluence point of the melted resin.

Example 2

Figure 10:
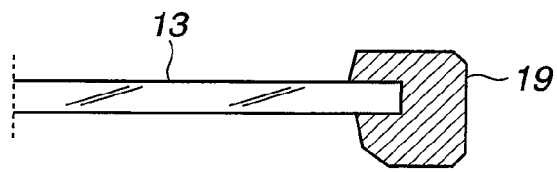
FIG. 10 is a section of around an edge of a glass with frame prepared in Example 2.

FIG. 10 shows a section of a frame portion of a plate glass with frame, which has been produced by a die according to the present invention, and in which frame 19 has been integrated with plate glass 13.

This glass with frame was produced by using a die shown in FIG. 5. The die was composed of upper die 11 and lower die 12. Upper die 11 was provided with additional cavity 16 communicating with cavity 14 for frame via coupling hole 15.

A polyvinyl chloride resin in melted condition was injected into cavity 14 for frame of the die shown in FIG. 5 from runner 17 and gate 18.

Then, after the resin solidified, upper die 11 was removed, and plate glass 13 with the molded frame was taken out of lower die 12. A glass with frame, in which frame 10 was integrated with plate glass 3, shown in FIG. 10, was produced by cutting off the resin formed in coupling hole 15 and additional cavity 16.

In the production of this glass with frame, there was almost no occurrence of breakage of plate glass at around cavity for frame, with which the runner couples.

Example 3

Figure 15:
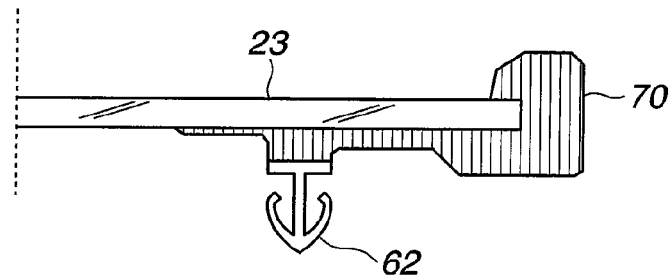
FIG. 15 is a section of around an edge of a glass with frame prepared by Example 3.

FIG. 15 shows a section of a frame portion of a plate glass with frame, which has been produced by a die according to the present invention, and in which frame 70 has been integrated with plate glass 23.

This glass with frame was produced by using a die shown in FIG. 11. The die was composed of upper die 21 and lower die 22. Lower die 22 was provided with additional cavity 61 communicating with cavity 24 for frame via first coupling hole 60.

Furthermore, additional cavity 26 communicating with cavity 24 for frame by coupling hole 25 was provided.

Clip 62 was used as a fixing component. Clip 62 was inserted into cavity 61 for fixing component. A polyvinyl chloride resin in melted condition was injected from an inlet, not shown in the drawings, into cavity 24 for frame of the die shown in FIG. 11.

Then, after the resin solidified, upper die 21 was removed, and plate glass 23 with the molded frame was taken out of lower die 22. A glass with frame, in which clip 62 was fixed to plate glass 23 by the polyvinyl chloride resin, and in which frame 70 was integrated with plate glass 23, shown in FIG. 15, was produced by cutting off the resin formed in coupling hole 25 and additional cavity 26.

In the production of this glass with frame, there was almost no occurrence of breakage of the fixing component and of breakage of plate glass at around the fixing component.

Example 4

FIG. 18 shows a section of a frame portion of a plate glass with frame, which has been produced by a die according to the present invention, and in which frame 30 has been integrated with plate glass 33.

This glass with frame was produced by using a die shown in FIG. 16. The die was composed of upper die 31 and lower die 32. Lower die 32 was provided with additional cavity 36 communicating with cavity 34 for frame via first coupling hole 35.

The thickness of the frame to be molded by the cavity for frame, provided with coupling hole 35, was set to 4 mm.

As shown in FIG. 16, plate glass 33 was retained between upper die 31 and lower die 32 in a manner that a peripheral portion of plate glass 33 was positioned in cavity 34 for frame, and a polyvinyl chloride series resin was injected from an inlet, not shown in the drawings.

Then, after the resin solidified, upper die 31 was removed, and plate glass 33 with the molded frame was taken out of lower die 32. A glass with frame shown in FIG. 18 was produced by cutting off the resin formed in coupling hole 35 and additional cavity 36.

In the production of this glass with frame, there was almost no occurrence of defects of unevenness and sink of the frame surface.

Comparative Example 1

A glass with frame was produced similar to Example 4 by closing coupling hole 35 of the die shown in FIG. 16. With this, many sinks were found on the frame surface.

The invention claimed is:

1. In an injection die used for molding a resin frame by injection molding at a peripheral portion of a plate glass, said injection die being separated into at least two pieces, a cavity for frame being formed between the separated dies, and the cavity for frame being provided with an additional cavity via a coupling hole, said injection die comprising at least one of the following characteristics:

(1) a first characteristic that the coupling hole is provided at a confluence point of a resin in melted condition of the cavity for frame; and (2) a second characteristic that the cavity for frame is provided with a runner that couples with the cavity via a gate and is for injecting a resin introduced from a resin inlet, into the cavity for frame, and the coupling hole and the gate are provided such that center line of the coupling hole and center line of the gate intersect with each other at an angle ranging from 45 degrees to 180 degrees on a section parallel to the plate glass of the cavity for frame.

2. An injection die according to claim 1, which is characterized in that the additional cavity is formed between the dies that are separated.

3. An injection die according to claim 1, which is characterized in that the additional cavity is formed in only one die of the dies that are separated.

4. An injection die according to claim 1, which is characterized in that, when the frame is formed, the additional cavity forms a closed space, except in that it couples with the cavity for frame via the coupling hole.

5. An injection die according to claim 1, which is characterized in that the additional cavity is formed by closing the runner and couples with the cavity for frame via the gate.

6. An injection die according to claim 1, wherein the plate glass has an edge that is opposed to the confluence point of the first characteristic, and the coupling hole of the first characteristic has a width that is parallel with and shorter than the edge of the plate glass.

7. In an injection die used for molding a resin frame by injection molding at a peripheral portion of a plate glass, said injection die being separated into at least two pieces, a cavity for frame being formed between the separated dies, and the cavity for frame being provided with an additional cavity via a coupling hole, said injection die comprising a characteristic that the cavity for frame, for forming a frame with a thickness of 4 mm to 12 mm, is provided, via the coupling hole, with the additional cavity forming a closed space having no communicating space except the coupling hole, wherein when a resin is injected into the cavity for frame, an air of the additional cavity becomes pressurized such that the resin is placed in a pressurized condition until the resin has solidified.

8. An injection die according to claim 7, which is characterized in that the additional cavity is formed between the dies that are separated.

9. An injection die according to claim 7, which is characterized in that the additional cavity is formed in only one die of the dies that are separated.

10. An injection die according to claim 7, which is characterized in that, when the frame is formed, the additional cavity forms a closed space, except in that it couples with the cavity for frame via the coupling hole.

11. An injection die according to claim 7, which is characterized in that the additional cavity is formed by closing the runner and couples with the cavity for frame via the gate.

12. An injection die according to claim 7, wherein the plate glass has an edge that is opposed to the confluence point of the first characteristic, and the coupling hole of the first characteristic has a width that is parallel with and shorter than the edge of the plate glass.

* * * * *